United States Patent [19]

Scecina et al.

[11] Patent Number: 5,511,223
[45] Date of Patent: Apr. 23, 1996

[54] DIVERSE PROCESSOR ELECTRONIC PROTECTION AND CONTROL MODULE

[75] Inventors: James Scecina, Forest; John G. Hinant; David P. Gerhard, both of Lynchburg, all of Va.

[73] Assignee: The B&W Nuclear Service Company, New Orleans, La.

[21] Appl. No.: 394,921

[22] Filed: Feb. 27, 1995

Related U.S. Application Data

[63] Continuation of Ser. No. 981,578, Nov. 25, 1992, abandoned.

[51] Int. Cl.$^6$ ........................................... G06F 11/00
[52] U.S. Cl. ................ 395/800; 395/550; 395/182.09; 364/431.01; 364/552; 364/224.9; 364/921.8; 364/923.1; 364/923.2; 364/924.4
[58] Field of Search ..................... 395/800, 550, 395/182.09; 364/431.01, 552, 224.9, 923.1, 923.2, 924.4

[56] References Cited

U.S. PATENT DOCUMENTS

| | | | |
|---|---|---|---|
| 4,215,386 | 7/1980 | Prager et al. | 361/686 |
| 4,750,111 | 6/1988 | Crosby, Sr. et al. | 395/550 |
| 4,766,516 | 8/1988 | Ozdemir et al. | 361/820 |
| 4,804,515 | 2/1989 | Crew et al. | 376/216 |
| 5,136,704 | 8/1992 | Danielsen et al. | 395/182.09 |

*Primary Examiner*—Alyssa H. Bowler
*Assistant Examiner*—Denise Tran
*Attorney, Agent, or Firm*—Daniel S. Kalka; Robert J. Edwards

[57] ABSTRACT

A digital electronic module arrangement includes a module rack carrying a plurality of individual modules which can each be plugged into the rack. A test rack is connected to the module for applying test signals to each module. The module can select either process inputs or test inputs. A testing device provided for individually testing module outputs which respond to a common input. Each module has a rear bus board which has a connector that can be plugged into the module rack, and a forward digital bus board. A window in the front panel allows direct viewing of indicia on a chip corresponding to code within the chip. This code is electronically compared to code in the module software which relates to the module function. A nameplate on the front panel carries the same indicia for ensuring visual verification that the correct function is attributed to the correct module. Electronic verification is also provided by equipment in the test rack. Each module contains two diverse processors with connected logic for producing redundant signal processing and for creating a trip output when faults are detected either in the process or in the functioning of the module.

6 Claims, 4 Drawing Sheets

DIVERSE PROCESSOR ELECTRONIC PROTECTION AND CONTROL MODULE

This is a continuation of application Ser. No. 07/981,578 filed Nov. 25, 1992 abandoned.

FIELD AND BACKGROUND OF THE INVENTION

The present invention relates to electronic modules used for controlling plant processes, or for protecting plant equipment such as nuclear power plant reactors.

For the purposes of this disclosure, the following definitions are utilized. The term "digital module" is defined as an assembly of electronic and structural components which can be installed and removed from an electronic system as one piece, and which is electrically connected to the system using one or more multi-circuit connectors, and which employs one or more digital processors to accept and manipulate input signals and generate output signals for process control, protection, or indication. The term "trip output contact" is defined as a mechanical or electronic relay contact which is part of a trip string. The term "trip string" is defined as a circuit consisting of a series connection of trip output contacts in which any of the contacts may open the circuit and deenergize (trip) the load fed by the string. The function of a trip string is to shut down a process in order to prevent damage to equipment or danger to public safety.

Prior art digital modules used in protection systems compute their protection functions all or in part by a single processor. These modules do not have an additional processor of diverse design that computes the same protection function. Therefore, a design fault in the processor or a peculiar susceptibility of the processor design to external influences will result in the failure of the processor to compute the protection function. If a multiple channel protection system uses the same type of digital module to compute the same protection function in each channel, the common failure mode susceptibility of the one processor design can result in the failure of the system to perform the protection function. For example, a design fault which causes a processor in a channel to cease operation due to an induced electrical transient can theoretically cause the counterpart processors in the remaining channels to also cease operation in the presence of the same transient. Common mode failures such as these can render a control or protection system inoperable, regardless of the number of redundant channels.

In prior art digital modules, a nameplate or label attached to the module is typically used to indicate the system function programmed into the module. This identification technique relies on individual diligence of those installing the label to assure correct labelling. Therefore, unless each module is tested to verify its function, it is possible that a labelling error can remain undetected and result in improper system operation. Also, this technique does not provide an electronic error indication when a digital module is inserted into an incorrect location in the system rack.

Control and protection system modules read process signals generated by the monitored plant process and use the data from these signals in control or protection algorithms. In order to verify the operability of the modules, test input signals are substituted for the process signals, and the module output response is compared to an expected correct response. For prior art modules, the input signal substitution usually requires that the process signal wires be disconnected from the modules and test signals connected in their place. This process is time consuming and creates the potential for errors in reconnecting the process signal wires after the test has been completed. An alternative method of the prior art is to accomplish selection between the test and process signals using switching means external to the module. The additional external switching hardware increases the cost and space requirements of the system.

Prior art testing of a series of module trip output contacts arranged in a trip string consists of tripping one or more module trip output contacts and observing the actual response of the trip string load. This test method does not provide a direct measurement of the operability and effect of a particular trip output contact on the trip string.

Some modules used in reactor protection systems perform two or more protection functions using a common input parameter, for example, reactor coolant pressure. Due to the dependency of the functions on the common input, prior art modules have no provisions for separately testing each function automatically.

Typical prior art digital module construction uses printed circuit boards which plug in at one end of each board to connectors which interface to the other electronics in the module. When analog and digital signals are utilized on the same board, using this connection arrangement means that both types of signals must pass through the same connector, and therefore must be routed in relatively close proximity to each other. This condition increases the potential for digital signal noise to be induced into the analog circuits, and cause the analog signals to be degraded. The single connector usually does not provide sufficient mechanical support to hold the board in place, particularly if the module must withstand seismic events. Therefore, additional hardware, such as card guides, must be used to retain the board in place, thus adding to the cost to manufacture the module.

SUMMARY OF THE INVENTION

The present invention comprises a multi-purpose, digital module with reliability enhancement features including dual diverse processors, diagnostic software and self-testing capabilities.

According to the present invention, two processors of diverse design are used to perform each trip output function of the module. This feature reduces the potential of the module to fail as a result of a susceptibility to a common external influence or from a common design fault in the processor hardware or software. Further, means are provided for visual verification of the function or functions which the module is programmed to perform without requiring functional testing. This feature can reduce operator confusion and avoid potentially serious consequences from human errors due to an incorrect functional labelling of the module.

The invention also includes means for verifying that a digital module is installed in the correct location in a system rack. This feature is especially useful for a system using physically identical digital modules that each have a different programmed function. Other means are provided for switching between process input signals and test input signals without disconnecting signal wirings or requiring external switching equipment. This design facilitates the testing process and is especially amenable to automated test methods.

The invention is also capable of directly measuring the response of a module trip output contact and its effect on the operation of the trip string by measuring the voltage across the contact. This method of testing provides more positive test data than by simple observation of the trip string response. Means are also provided to separately test one trip output contact in a trip string even though other trip output contacts controlled from the module in the same trip string open before or during the test.

A method of construction in which horizontal printed circuit boards are situated in between two vertical printed circuit boards is also included. This arrangement provides rigid support to the horizontal boards without requiring card guides, and permits better separation between analog and digital signal traces on the horizontal boards than prior art construction methods. A means for installing program memory for both processors which eliminates the potential for installing mismatched memories, permits the memory to be installed in one operation instead of two operations, and is physically easier to install than installing two memory components in separate sockets is also provided.

Where relay contacts are shown or mentioned in the description, the contact function can be accomplished using either solid state or mechanical relays.

Function identity codes in an identity chip of the invention, processor memories, and other parts hardwired to backplane connectors of the invention can be read by a processor located either within or external to the module.

The method of matching the function identity codes of the two processor programs to an identity chip code and a backplane connector code can also be extended to match function identity codes of any number of processors.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
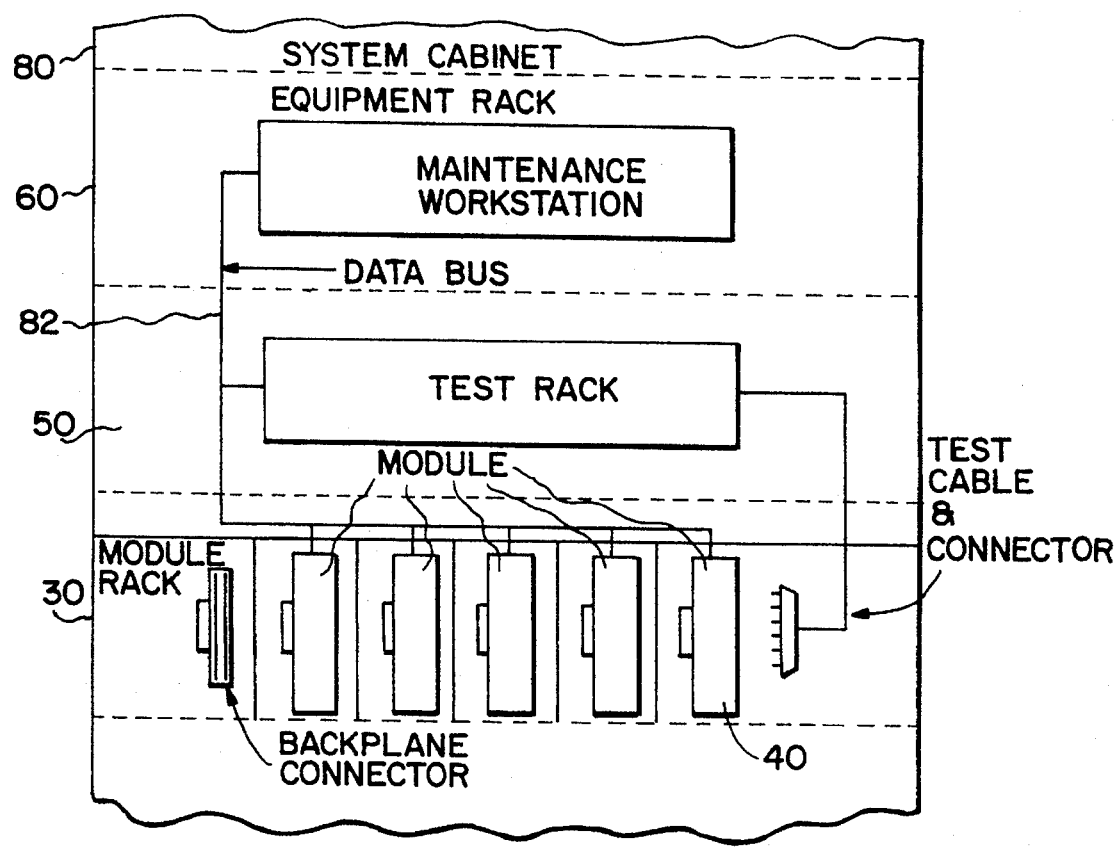
FIG. 1 is a schematic elevational view of an equipment or system cabinet containing multiple modules and other test and maintenance devices according to the present invention.

The various features of the present invention are embodied in a digital module that can be used alone or with other modules to comprise a control or protection system. This arrangement is illustrated in FIG. 1. The module 40 is typically situated in a module rack 30 alongside other modules. The module 40 is inserted into the rack 30 from the front. When fully inserted, connections shown at 42 in FIG. 5, to power and process signals are established by the mating of one or more connectors at the rear of the module to stationary connectors mounted on the backplane of the rack.

Auxiliary equipment required for testing the modules as described herein and for changing tuning and setpoint constants in the modules may also be located in equipment racks 50 and 60 in the system cabinets 80. A data bus 82 is used for communications between the modules and the auxiliary equipment. The data bus handles test command and data signals only. A removable cable and connector assembly is used for connecting test input and output signals between the test rack and the module. No permanent connection between the module and the test rack or test control device is required during normal (non-test) operation. For the special case of a protection system using a trip string, the module will have one or more trip output contacts connected in series in the trip string, which in turn may contain trip output contacts from other modules.

The present invention features a design for an electronic module that uses two diversely designed processors for computing protection algorithms. Due to the diverse processor hardware, the design reduces the susceptibility of the module to common mode failures.

Figure 2:
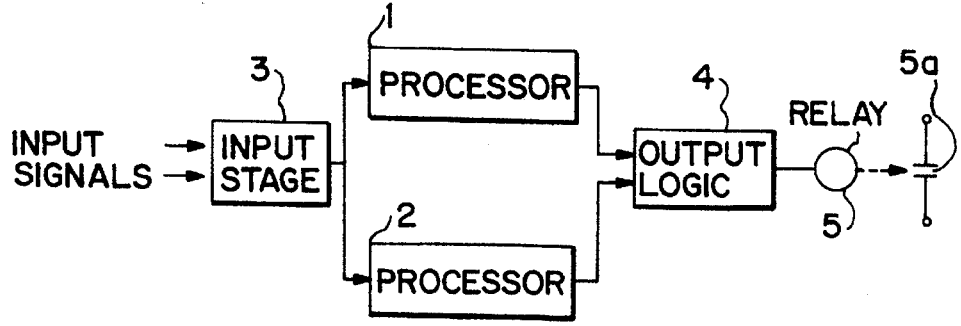
FIG. 2 is a block diagram showing the architecture of a module constructed according to the present invention.

The architecture as shown in FIG. 2 is designed to cause the module output to go to a preferred state as described below even if one of the diverse processors fails. In operation, diverse processors 1 and 2 receive input data in digital form from input stage 3. Each processor computes its algorithm using the input data and generates an output response based on the outcome of the algorithm computation. The output response is a digital signal which can be either an "on" or an "off" signal to the output logic 4. The "on" signal is formatted as a code that can only be generated when the processor is operable. The "off" output signal can be generated intentionally by the processor and will also result if a failure occurs in the processor if the processor loses power.

For a module output which is a trip output contact, the preferred state of the output is the "off" state. To make the module output contact function as a trip output contact, output logic 4 can be designed so that the final output from the module, shown here as a relay 5 with contact 5a, is driven "on" (i.e., relay contact 5a is held closed) only when both processors issue an "on" output. For this output logic, an "off" output signal from either or both processors would cause the relay output to be "off" (i.e., relay contact 5a is opened). This logic scheme used with the diverse processor architecture described above ensures that the module trip output can achieve the "off" state when desired even if one of the diverse processors fails. Using a prior art single processor design, a failure in the processor could result in a failure to achieve the "off" state when desired.

If the preferred state of the module output contact is the "on" state, the output logic 4 can be designed to cause the output contact 5a to be driven "on" when either or both processors issue an "on" output. For this output logic, only an "off" output signal from both processors would cause the relay output to be "off". This logic scheme ensures that the module output can achieve the "on" state when desired even if one of the diverse processors fails. Using a prior art single processor design, a failure in the processor could result in a failure to achieve the "on" state when desired.

The present invention provides means for relating the functional information on the nameplate of a digital module to the software program in the module. The module is typically situated in a system's electronic equipment rack, like rack 50, beside other modules of the same design and appearance. In prior art designs, the function which each module performs is apparent only from information indicated on the function label or nameplate located on or near the module. In this situation, one module can be easily mistaken for another. A clear and positive means of functional identification is essential to minimize human errors in operating and maintaining the system. The description which follows describes how improper identification of the function of a digital module is prevented using this invention.

Figure 3:
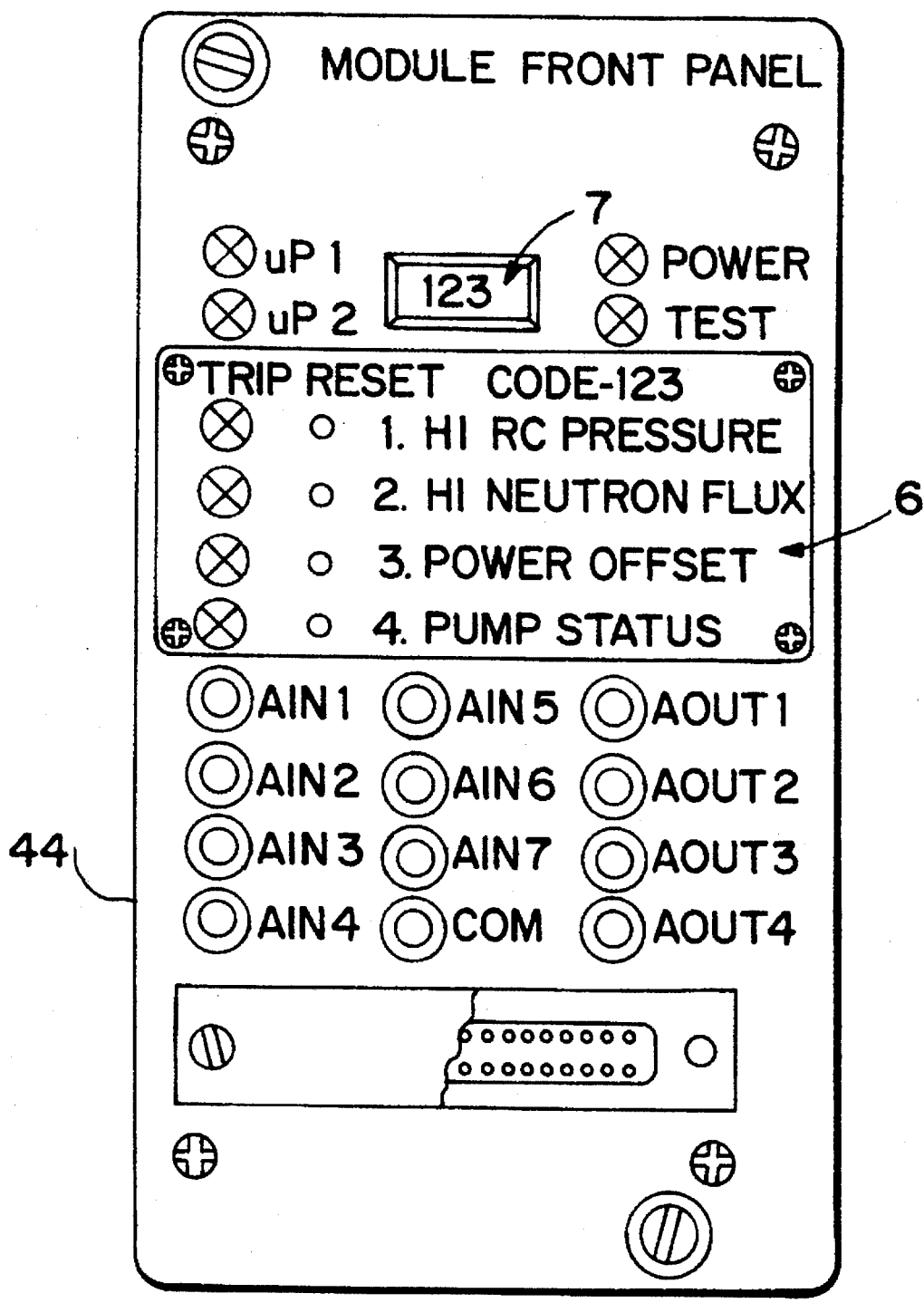
FIG. 3 is a front elevational view showing the front panel of a module of the invention.

FIG. 3 illustrates a module front panel 44 which contains a nameplate 6 located on the panel and an identity chip 7 located behind the panel but visible from the front of the panel. The front panel may contain other indications, controls and test points such as those illustrated. Nameplate 6 is imprinted with a textual description of the functions programmed into the module and a numeric code (e.g. 123). Identity chip 7 is imprinted with a visible numeric code (e.g. 123) and also contains an electronically readable code. The programmable memories of the module's processors 1 and 2 (shown in FIG. 2) also contain an electronically readable code. Correlation between the electronic code in the identity chip 7 and the electronic code in the processor 1 and 2 memories establishes the correctness of the indentity chip 7. Once the validity of the identity chip has been electronically established, the correctness of the nameplate 6 can be established by visually confirming that the codes on the nameplate 6 and the identity chip 7 are identical to each other.

The invention thus provides an electronic means for verifying that a digital module is installed in the correct location in a system rack. In a typical system rack, the system modules are inserted into connectors located in the backplane of the rack. In this invention, dedicated circuits on the backplane connectors are hardwired to contain a location code such that each circuit, when read by a code reader, is at a voltage value which is interpreted as the digital equivalent of a "1" or a "0". This code formed by the combination of the "1's" and "O's" is compared for equivalence to a code in the program memories of the module's processors 1 and 2 to verify that the module is inserted in the correct rack location.

Figure 4:
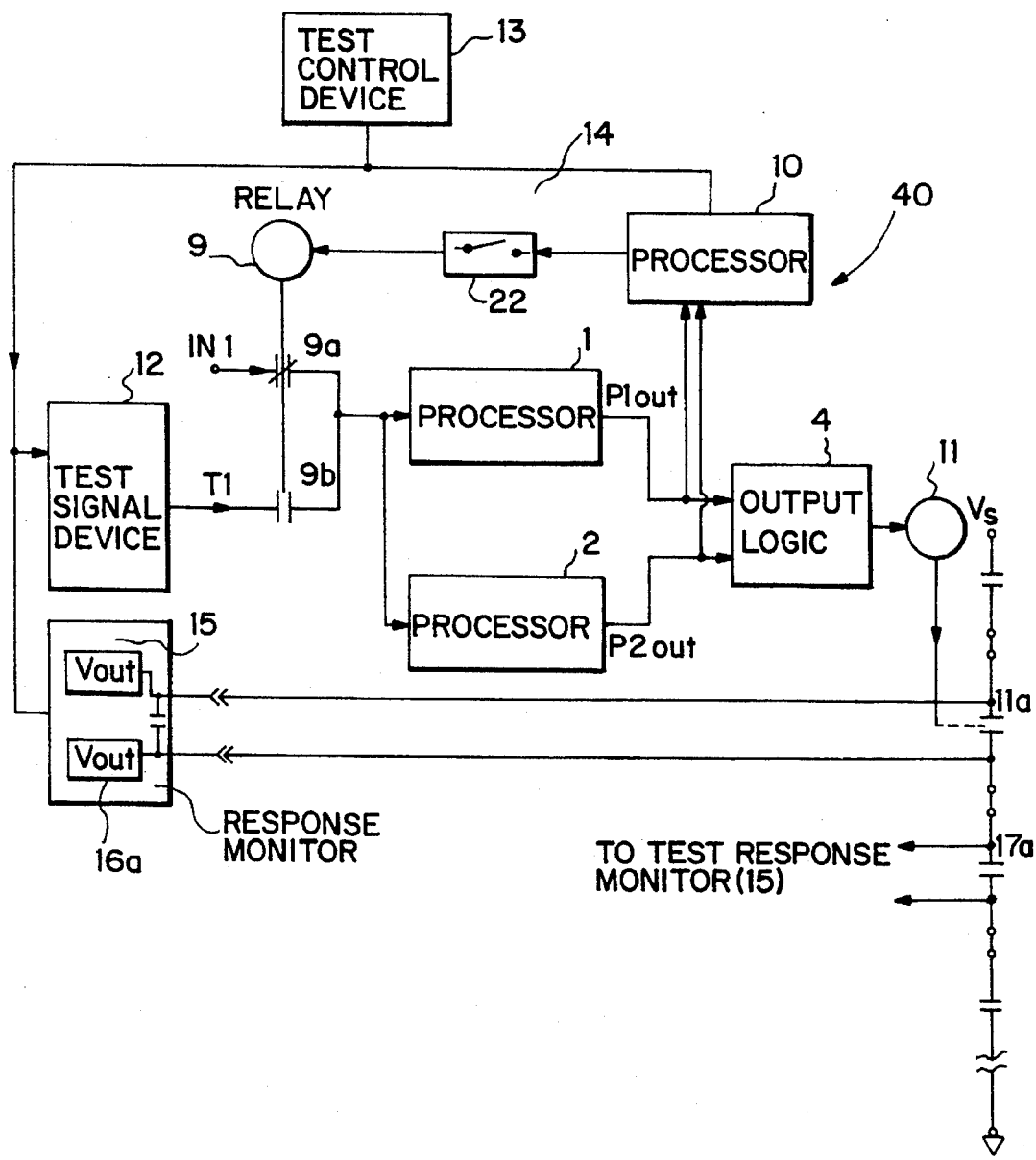
FIG. 4 is a block diagram showing the testing method and arrangement of the module according to the present invention.

The invention includes a method for switching between process signals which are input to the module during normal operation and test signals which are input to verify the operability of the module. The design is illustrated in FIG. 4. The testing means consists of signal switching devices 9, 10 and 22 which are contained in the module 40, and test signal generating device 12 and test control device 13 which are external to the module. During normal (non-test mode) operation, relay 9 is in the deenergized state, which causes the process input signal IN1 to be connected to processors 1 and 2 through the normally closed relay contact 9a.

Test signal T1 is blocked by normally open contact 9b. When in the open position, an externally controlled interlock 22 opens the current path to relay coil 9 to prevent switching of input signals. To permit test signals to be read by the module, interlock 22 is placed in the closed position. During the test mode of operation, test control device 13 directs processor 10 over data bus 14 to energize relay 9, causing relay contact 9a to open and 9b to close, thus disconnecting the process signal IN1 and connecting the test signal T1 to the input of processors 1 and 2.

The value of test signal T1, which can be an analog or discrete value, is controlled by a pre-established software program in the test control device 13. Test signal control instructions are sent via data bus 14 to the test signal generating device 12 to generate the desired test signal. Processors 1 and 2 are checked for proper response to the test input signal by reading the "on" or "off" state of output signals P1OUT and P2OUT by processor 10, that transmits this test response data to the test control device 13 via data bus 14.

If the output contact 11a is a trip output contact connected in a trip string, the response of the module trip output contact and its effect on the operation of the trip string can be directly measured by measuring the voltage levels of Vout and Vout' using voltmeters in test response monitoring device 15. Prior to a trip from the module, Vout and Vout' will both be at voltage level $V_s$ indicating that contact 11a is closed. If electrical continuity is maintained across all other components in the trip string when contact 11 is opened, the voltage difference between Vout and Vout' will be $V_s$, verifying that the contact 11a has opened and interrupted the flow of current through the trip string.

The invention provides an additional feature that allows the above test to be performed for multiple trip output contacts controlled by one module and arranged in series in a trip string. In order to test all of the trip output contacts, each must be separately tested to verify that each is capable of providing a trip response in the trip string. For the case of two trip output contacts 11a and 17a shown in FIG. 4, separate testing of contact 17a requires that contact 11a be bypassed to prevent it from interrupting the flow of current through the trip string, which could otherwise occur if contact 11a responds to the same test input signal as contact 17a. Contact 11a is bypassed by contact 16a which is driven closed by the test response monitoring device 15, thus preventing contact 11a from interrupting current in the trip string. If contact 17a is opened in response to a test input, a trip of the trip string will result. Measuring the voltage across contact 17a using voltage measuring means in monitor 15, similar to those used to test contact 11a, data can be obtained which confirms that contact 17a caused the trip.

Figure 5:
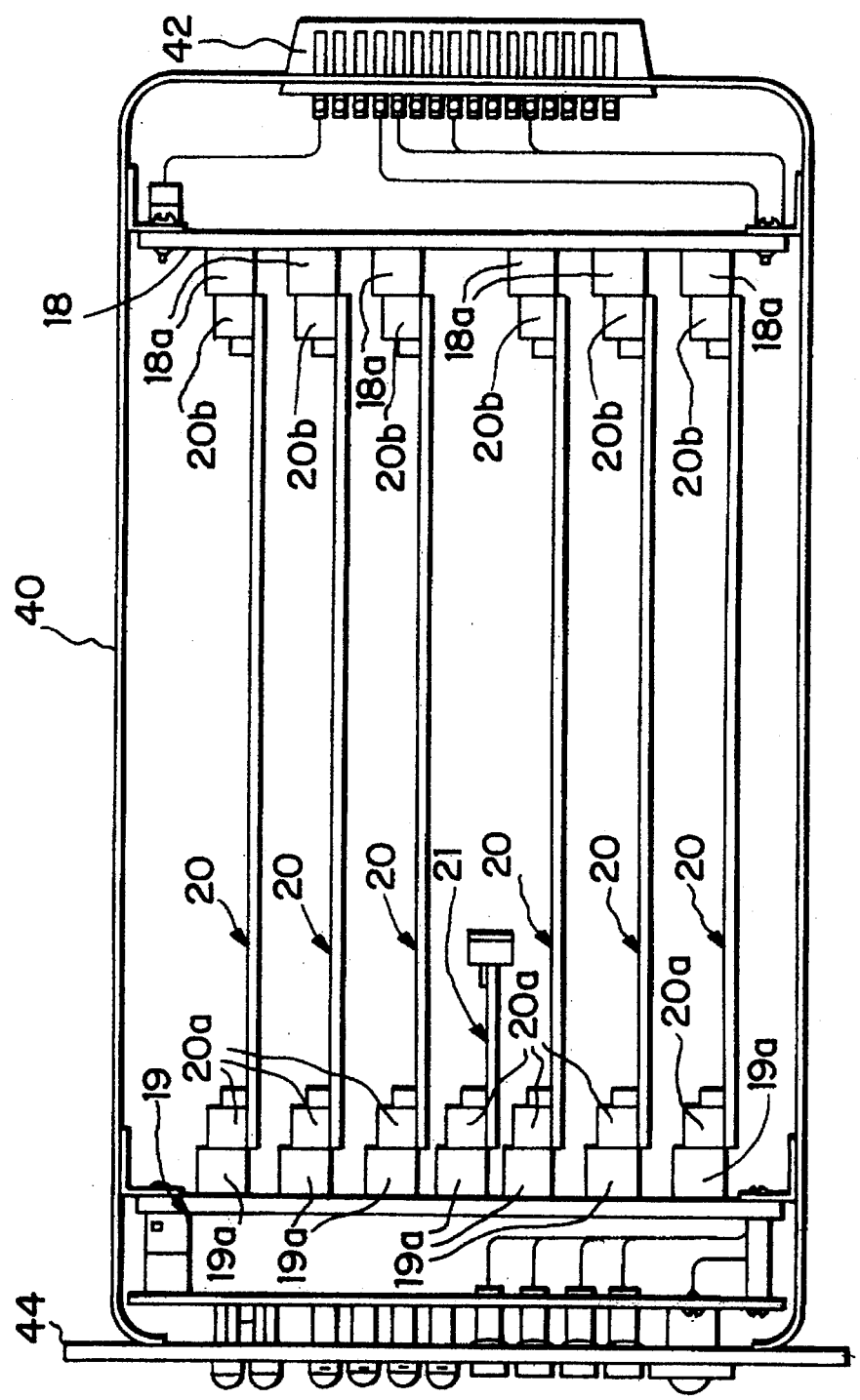
FIG. 5 is a side elevational view of a module according to the present invention.

The invention features a method of construction in which printed circuit boards are connected at opposite ends to main bus boards. The design is illustrated in FIG. 5. A field bus board 18 and a digital bus board 19, both containing connector halves 18a and 19a, are vertically situated at opposite ends of the module. Printed circuit boards 20, contain connector halves 20a and 20b that mate to 19a and 18a, respectively, and are situated horizontally between the vertical boards. This design permits the horizontal PC boards 20 to be held in place in the x axis by the rigidity of the bus boards 18 and 19, and to be held in place in the y axis and the axis perpendicular to the plane of FIG. 5 by the interlocking fit of the mating connectors at each end of the PC board 20.

This method of mechanical retention of PC boards has the advantage of greater rigidity over prior art designs which connect at one end of the PC board only, and eliminates the need for additional supports such as card guides. The field bus board and digital bus board provide electrical interconnection between the printed circuit boards 20 that contain module control components. This design permits digital signals from the digital bus board 19 to enter the PC board 20 through the connecter at one end of the board, while analog signals from the field bus board 18 enter the PC board 20 at the opposite end for the board. This feature permits greater separation between the digital signal lines and the analog signal lines than prior art designs in which all signals must enter a board from one end. The additional separation between analog and digital signal lines provided by this invention has the advantage of preventing contamination of the analog signals by digital electrical noise.

The invention features a design for installing program memory for processors 1 and 2 by means of a printed circuit board 21 which contains the memory components and a connector 21a. The memory is installed into the module by plugging board 21 into the connector 19b. Other methods of memory insertion such as inserting individual memory into separate sockets for each processor have the disadvantage of the potential for installing a memory component for processor 1 that has a programmed function which is not matched to the programmed function in the memory component for processor 2.

Test rack and test control device can be located external to the cabinet (e.g. portable) without affecting the essence of the invention.

The test rack only provides test inputs and monitors outputs. Process signals come from the field directly to the module. The module contains internal relays for switching between process and test inputs.

Interconnections for test input signals to the module and monitored output signals from the module are made via a cable/connector assembly which plugs into the front of the module at the time of the test.

The unique features of the test rack are that it measures voltage across the trip output contact to verify that the contact has opened and the rack contains relay contacts which bypass trip output contacts which are not being tested in the module, but which might open due to responding to an input which is common to a function being tested. This latter feature permits individual validation of each trip output circuit.

While the specific embodiments of the invention have been shown and described in detail to illustrate the application of the principles of the invention, it will be understood that the invention may be embodied otherwise without departing from such principles. One example is that while FIG. 4 depicts four output contacts in the trip string, there can be an indefinite number of output contacts. Similarly, the method of matching the function identity codes of the two processor programs to an identity chip code and a backplane connector code can also be extended to match function identity codes of any number of processors.

What is claimed is:

1. An improved control system for receiving input signals and for outputting output signals for use in one of process control, protection and indication, comprising:

at least one digital module, each of the at least one digital modules having a signal input stage, two diverse processors, and an output logic stage, said signal input stage receiving an input signal from a process and outputting a digital signal to said two diverse processors, said two diverse processors being of different design for computing a protection function and each connected to said signal input stage for receiving the same digital signal therefrom, each processor subjecting the digital signal to its own algorithm to create an output signal indicative of an operable processor, said output logic stage connected to said two diverse processors for receiving said two diverse processor output signals and for outputting an output signal, said output logic stage having logic means for generating the output logic stage output signal based upon a difference between said two diverse processor output signals and sending the output logic stage output signal to a plurality of trip output contacts connected in a trip string, one of said trip output contacts being constructed to place the at least one digital module in a desired state if one of said two diverse processors fail;

means for switching between the input signal from the process and a test signal, said switching means including relay means for allowing the input signal from the process to be connected to the at least one digital module and interlocking means for permitting a test signal to be read by the at least one digital module when disconnecting the input signal from the process from the at least one digital module;

test signal generating means connected to the two diverse processors for generating the test signal and sending the test signal to each of the two diverse processors;

test control means connected to the test signal generating means for checking a response from the two diverse processors; and response monitoring means for measuring a voltage of one of the trip output contacts in the trip string for monitoring the response of the at least one digital module trip output contact.

2. The improved control system according to claim 1, wherein said at least one digital module comprises a field bus board at a rear end of said module for analog signals, a digital bus board spaced from said field bus board at a front end of said module for digital signals, a plurality of printed circuit boards connected between said field and digital bus boards, connection means connected to said field bus board and constructed to connect into a receptacle in a module rack, and front panel means for displaying information concerning said module.

3. The improved control system according to claim 1, including a system cabinet with a module rack mounted in said cabinet and having a plurality of module receiving connectors, each of the at least one digital modules including a rear end and a front end with a connector at the rear end of each of the at least one digital modules which is pluggable into one of the module receiving connectors in the module rack, said system cabinet further having a test rack mounted therein along with a work station rack and a data bus for connecting said test rack and work station to each of the module receiving connectors for testing the functionality and identity of any of the at least one digital module plugged into the module receiving connectors of the module rack.

4. The improved control system according to claim 2, wherein the circuit boards are horizontal and the bus boards are vertical, each of said at least one modules having a case which is free of card guides for supporting each circuit board at its opposite ends by said bus boards.

5. The improved control system according to claim 4, including at least one memory board connected to the digital bus board only, for providing memory for the at least two processors.

6. An improved control system for receiving input signals and for outputting output signals for use in one of process control, protection and indication, comprising:

at least one digital module, each of the at least one digital modules having a signal input stage, two diverse processors, and an output logic stage, said signal input stage receiving an input signal from a process and outputting a digital signal to said two diverse processors, said two diverse processors each being of a different design for computing a protection function and connected to said signal input stage for receiving the same digital signal therefrom, each processor subjecting the digital signal to its own algorithm to create an output signal indicative of an operable processor, said output logic stage connected to said two diverse processors for receiving said two diverse processor output signals and for outputting an output signal, said output logic stage having logic means for generating the output logic stage output signal based upon a difference in said two diverse processor output signals and sending the output logic stage output signal to switching means for placing the at least one digital module in a desired state if one of said two diverse processors fail; and a system cabinet with a module rack mounted in said cabinet and having a plurality of module receiving connectors, each of the at least one digital modules including a rear end and a front end with a connector at the rear end of each of the at least one digital modules which is pluggable into one of the module receiving connectors in the module rack, said system cabinet further having a test rack mounted therein along with a work station rack and a data bus for connecting said test rack and work station to each of the module receiving connectors for testing the functionality and identity of any of the at least one digital modules plugged into the module receiving connectors of the module rack, each of the at least one digital modules including a trip output contact which is opened and closed based upon a difference between the two diverse processor output signals, the test rack including means for measuring a voltage across the contact of each of the at least one digital modules when each of the at least one digital modules contact is open to test the trip output contact for each of the at least one digital modules separately, said means for measuring a voltage including a bypass contact for each output contact tested to provide for sequential testing of each output contact of multiple trip output contacts controlled by any one of the at least one digital modules and arranged in series in a trip string.

* * * * *